United States Patent
Koyama

(10) Patent No.: US 8,348,232 B2
(45) Date of Patent: Jan. 8, 2013

(54) HYDRAULIC DEVICE WITH SOLENOID VALVE

(75) Inventor: Fumitoshi Koyama, Kariya (JP)

(73) Assignee: Advics Co., Ltd., Kariya, Aichi (JP)

( * ) Notice: Subject to any disclaimer, the term of this patent is extended or adjusted under 35 U.S.C. 154(b) by 303 days.

(21) Appl. No.: 12/882,663

(22) Filed: Sep. 15, 2010

(65) Prior Publication Data
US 2011/0062362 A1    Mar. 17, 2011

(30) Foreign Application Priority Data

Sep. 17, 2009   (JP) .................................. 2009-215767

(51) Int. Cl.
*F16K 31/02*   (2006.01)
(52) U.S. Cl. ................. 251/129.15; 303/119.2
(58) Field of Classification Search .............. 251/129.15; 303/119.2
See application file for complete search history.

(56) References Cited

U.S. PATENT DOCUMENTS

| | | | | |
|---|---|---|---|---|
| 5,333,946 A | * | 8/1994 | Goossens et al. | ........... 303/119.2 |
| 5,544,857 A | * | 8/1996 | Torrence | ................. 251/129.15 |
| 5,984,261 A | * | 11/1999 | Akita | ......................... 303/119.2 |
| 6,644,623 B1 | | 11/2003 | Voss et al. | |
| 6,745,634 B2 | | 6/2004 | Beck et al. | |
| 6,774,753 B2 | * | 8/2004 | Shirase et al. | ........... 251/129.15 |
| 7,871,056 B2 | * | 1/2011 | Kratzer | ..................... 251/129.15 |
| 8,132,779 B2 | * | 3/2012 | Lee | ........................... 251/129.15 |
| 2004/0089832 A1 | | 5/2004 | Wilde et al. | |

FOREIGN PATENT DOCUMENTS

| | | |
|---|---|---|
| JP | 09-014500 A | 1/1997 |
| JP | 09-159044 A | 6/1997 |
| JP | 10-082478 A | 3/1998 |
| JP | 2003-503260 A | 1/2003 |
| JP | 2004-505834 A | 2/2004 |
| JP | 2008-273507 A | 11/2008 |
| WO | WO 01/60669 A1 | 8/2001 |

* cited by examiner

*Primary Examiner* — Kevin Lee
(74) *Attorney, Agent, or Firm* — Buchanan Ingersoll & Rooney PC

(57) ABSTRACT

A hydraulic device includes a housing and a solenoid valve to be mounted to the housing. The solenoid valve includes a plunger and a plunger-mounting sleeve in which the plunger is mounted. The plunger-mounting sleeve includes a sleeve member and a sleeve flange having a flange portion and a cylindrical portion provided at the radially outer edge of the flange portion. The plunger-mounting sleeve is fixed to the housing by seating a flange portion of the sleeve flange on a shoulder formed on a mounting hole formed in the housing, press-fitting a mounting ring loosely fitted around the sleeve member into the cylindrical portion of the sleeve flange, thereby pressing the flange portion against a seating surface of the shoulder, and further wedging the cylindrical portion into the inner periphery of the mounting hole.

10 Claims, 4 Drawing Sheets

HYDRAULIC DEVICE WITH SOLENOID VALVE

CROSS REFERENCE TO RELATED APPLICATIONS

This application is based on and claims priority under 35 U.S.C. sctn. 119 with respect to Japanese Patent Application No. 2009-215767 filed on Sep. 17, 2009, the entire content of which is incorporated herein by reference.

BACKGROUND OF THE INVENTION

This invention relates to a hydraulic device, such as a brake hydraulic pressure control device, including a solenoid valve mounted to a housing for opening and closing oil passages and adjusting the degree of opening of its valve portion, and particularly a hydraulic device in which the solenoid valve is mounted to the housing in an improved manner so as to simplify the structure of the solenoid valve and reduce the cost of the hydraulic device.

Conventional solenoid valves used in vehicle brake hydraulic pressure control devices are disclosed n JP Patent Publications 09-14500A (Patent document 1) and 10-82478A (Patent document 2).

The solenoid valve shown in Patent document 1 comprises a plunger for driving a valve body, a shaft (valve rod) integral with the plunger, a core as a guide member through which the shaft is inserted, and a sleeve made by pressing and covering the plunger and the core. The solenoid valve is mounted to the housing by fixing the sleeve to the housing.

The housing has a mounting hole in which the valve portion of the solenoid valve is mounted. The mounting hole has a shoulder which divides the mounting hole into a large-diameter portion including the open end of the mounting hole and the remaining small-diameter portion. The core of the solenoid valve has on its outer periphery a tapered portion (flange) having a tapered top surface which is inclined radially outwardly and downwardly. The sleeve of the solenoid valve has a tapered skirt portion at its bottom open end. The sleeve is fixed to the housing by seating the tapered portion of the core on the shoulder of the mounting hole of the housing, placing the tapered skirt portion of the sleeve on the tapered top surface of the tapered portion of the core, fitting a back-up ring which can be fitted in the large-diameter portion of the mounting hole on the sleeve to place the ring on its skirt portion, and caulking the portion of the housing near the open end of the mounting hole to press the tapered portion of the core through the back-up ring.

The oil passages in the housing are liquid-tightly sealed at the portion where the solenoid valve is mounted by forming a metal-sealed portion by pressing the tapered portion of the core against the shoulder of the mounting hole.

In Patent document 2, an annular spacer is used instead of the back-up ring. The solenoid valve of Patent document 2 is fixed to the housing by plastically deforming the annular spacer to press it into an undercut portion formed on the inner periphery of the mounting hole.

In the arrangement of Patent document 2, (instead of the tapered portion of the Patent document 1) a large-diameter portion having no tapered top surface is formed on outer periphery of the core and seated on the shoulder of the mounting hole. The sleeve has a flange at its open end portion. With the flange of the sleeve placed on the large-diameter portion of the core, the flange of the sleeve and the large-diameter portion of the core are pressed by the annular spacer and are pushed into the undercut portion and fixed in position in the mounting hole by plastically deforming the annular spacer. The oil passages in the housing are liquid-tightly sealed at the portion where the solenoid valve is mounted in the same manner as with the solenoid valve of Patent document 1.

With the solenoid valves of Patent documents 1 and 2, when the sleeve is fixed in position by the back-up ring or annular spacer, the sleeve is compressed. In order for the sleeve to be able to withstand the compression force and in order to keep sufficiently close contact between the liquid-tight seal surfaces, the sleeve, which is formed by pressing, is reinforced by the core. Thus, high rigidity is required for the core.

With the solenoid valves of Patent documents 1 and 2, the core, which is made of a magnetic material and is magnetized when the coil is energized, is provided between the plunger and the housing. But there are solenoid valves of a different type in which the plunger is located between the housing and the magnetic core. In such solenoid valves, no magnetic core is necessary between the plunger and the housing. But in such a case too, it is necessary to provide a core having high rigidity between the plunger and the housing in order to reinforce the sleeve. This complicates the structure of the solenoid valve and also increases its cost.

Thus, for the type of solenoid valves in which the plunger is provided between the magnetic core and the housing, it is being desired to improve the connecting structure of the sleeve, which is formed by pressing, to the housing to simplify the structure of the solenoid valve.

SUMMARY OF THE INVENTION

An object of the present invention is to provide a hydraulic device with a solenoid valve in which the sleeve of the solenoid valve in which the plunger is mounted can be stably fixed to the housing of the hydraulic device without reinforcing the sleeve, and in which the sleeve can liquid-tightly seal oil passages formed in the housing at a portion where the solenoid valve is mounted.

In order to achieve this object, the present invention provides a hydraulic device comprising:

a housing formed with oil passages therein;

the housing being further formed with a mounting hole having a first end communicating with the oil passages and a second open end open to the surface of the housing;

a solenoid valve mounted in the mounting hole, and having a valve portion comprising a valve body and a valve seat, and provided between the oil passages for selectively opening and closing the oil passages and adjusting the degree of opening of the oil passages; and a mounting ring having a tapered surface on an outer periphery thereof, the tapered surface being inclined such that its diameter increases toward the second open end of the mounting hole, for fixing the solenoid valve to the housing;

the mounting hole having a shoulder which divides the mounting hole into a small-diameter portion including the first end of the mounting hole, and a large-diameter portion including the second open end of the mounting hole and having a larger diameter than the small-diameter portion;

the solenoid valve further comprising a plunger-mounting sleeve having a first end inserted in the mounting hole and a second end protruding from the housing, an energizing coil fitted around the second end of the plunger-mounting sleeve, and a plunger slidably mounted in the plunger-mounting sleeve and configured to be driven under a magnetic attraction force produced when the coil is energized; the valve body being integral with the sleeve;

the plunger-mounting sleeve comprising a cylindrical sleeve member, and a sleeve flange comprising a flange portion liquid-tightly joined to an outer periphery of the sleeve member, and a cylindrical portion integrally formed at an outer periphery of the flange portion and bent toward the second open end of the mounting hole;

wherein the flange portion of the sleeve flange being seated on the shoulder of the mounting hole; and wherein the mounting ring has an inner diameter larger than an outer diameter of the sleeve member and is loosely fitted around the sleeve member while being press-fitted in the cylindrical portion, and wherein the mounting ring presses the flange portion against a seating surface on the shoulder and at least partially wedges (buries) the cylindrical portion into the inner peripheral surface of the mounting hole, thereby fixing the plunger-mounting sleeve to the housing.

Preferred forms of this hydraulic device are listed below:

1) The tapered surface of the mounting ring has a diameter at its end near the second open end of the mounting hole that is larger than the difference between the inner diameter of the large-diameter portion of the mounting hole and twice the thickness of the cylindrical portion of the sleeve flange.

2) The sleeve member and the sleeve flange of the plunger-mounting sleeve are formed by plastic working of a metal.

3) The sleeve flange and the mounting ring are made of a material having higher hardness than the housing.

4) The valve body is fixed to the plunger through a valve rod, and the hydraulic device further comprises a moving guide for guiding the movement of the valve rod which is mounted in the sleeve member of the plunger-mounting sleeve so as to be slidable relative to one of the valve rod and the sleeve member.

5) The moving guide is held by the other of the valve rod and the sleeve member.

6) A caulked portion is formed on the inner periphery of the mounting hole near its second open end for engaging the mounting ring and keeping the mounting ring in position.

7) There are a plurality of the caulked portions that are circumferentially spaced from each other.

8) The mounting ring is threaded into the mounting hole from the second open end thereof and fixed in position.

9) The valve seat is mounted in the sleeve flange and fixed to the sleeve flange by caulking.

With the hydraulic device according to this invention, the plunger-mounting sleeve of the solenoid valve is fixed to the housing by wedging a portion of the cylindrical portion of the sleeve flange of the plunger-mounting sleeve into inner peripheral surface of the mounting hole formed in the housing.

The cylindrical portion of the sleeve flange can be deformed such that its open end is radially expanded by press-fitting the mounting ring into the cylindrical portion. At this time, the cylindrical portion is at least partially fitted into the housing. The cylindrical portion of the sleeve flange thus engages the housing, fixing the plunger-mounting sleeve to the housing.

If the cylindrical portion of the sleeve flange is wedged into the inner peripheral surface of the mounting hole over the entire circumference thereof, the cylindrical portion serves both to fix the sleeve to the housing and to provide a liquid-tight seal between the oil passages formed in the housing and the outside.

By pressing the flange portion against the seating surface on the shoulder of the mounting hole by the mounting ring, it is possible to bring the flange portion into close contact with the shoulder of the mounting flange, thereby increasing the seal surface area, which in turn ensures more reliable liquid-tight seal between the oil passages formed in the housing and the outside. If the cylindrical portion of the sleeve flange is only partially wedged into the inner peripheral surface of the mounting hole, the seating surface of the shoulder on the mounting hole and the surface of the flange portion in contact with the seating surface provides an effective liquid-tight seal between the oil passages in the housing and the outside.

Since the mounting ring is loosely fitted around the cylindrical sleeve member of the plunger-mounting sleeve, no compressive force acts on the cylindrical sleeve member when the mounting ring is press-fitted. This prevents deformation of the cylindrical sleeve member even though it is not reinforced.

With this arrangement, the core having high rigidity, which was provided in the sleeve of a conventional solenoid valve, is not necessary. Thus, it is possible to reduce the cost for the core.

The operation and advantages of the preferred embodiments are described below.

DETAILED DESCRIPTION OF THE PREFERRED EMBODIMENTS

Now the hydraulic device embodying the present invention is described with reference to FIGS. 1 to 6. The characterizing feature of this device lies in its portion where the solenoid valve is mounted in position.

Figure 1:
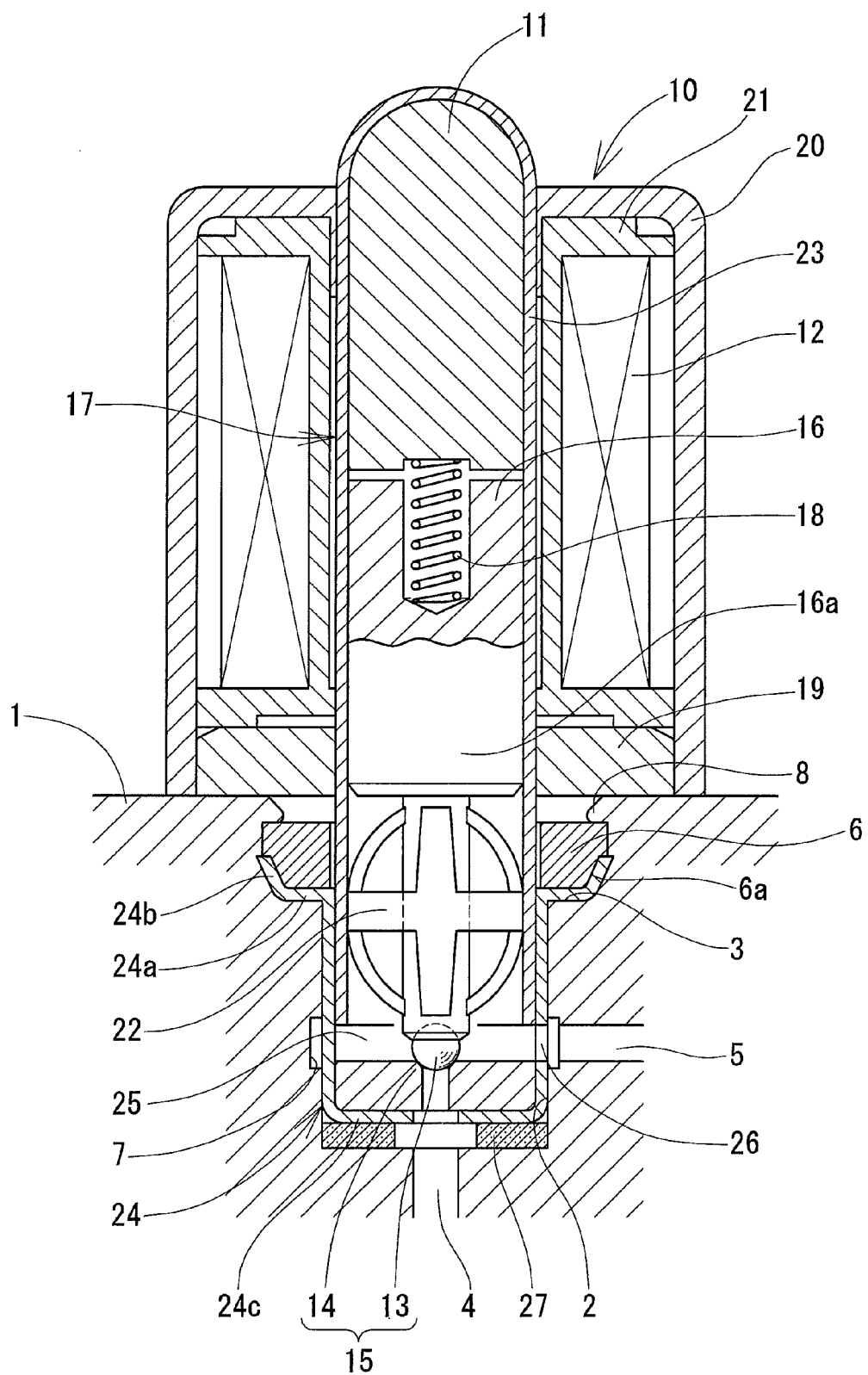
FIG. 1 is a sectional view of a portion of a hydraulic device embodying the present invention (its portion where the solenoid valve is mounted in position)

The hydraulic device shown in FIG. 1 includes, as main component parts, a housing 1 formed with a mounting hole 2, a solenoid valve 10 mounted in the mounting hole 2 for controlling hydraulic pressure, and a mounting ring 6 for fixing the solenoid valve 10 to the housing 1.

Oil passages 4 and 5 are formed in the housing 1. If the present invention is applied to a hydraulic pressure control device for a vehicle brake assembly, the oil passages serve as pressure increasing passages connecting a power pump in a master cylinder or a hydraulic pressure control device (none of them are shown) to wheel cylinders (not shown either), or as pressure reducing passages connecting the wheel cylinders to a reservoir. The solenoid valve 10 selectively opens and closes communication between the oil passages 4 and 5 and also adjusts the degree of opening of a valve portion.

The mounting hole 2 of the housing 1 communicates at one end thereof with the oil passages 4 and 5, and has its other end open to the surface of the housing 1. The mounting hole 2 has a shoulder 3 on its inner periphery near its open end. The shoulder 3 divides the mounting hole 2 into a small-diameter portion communicating with the oil passages 4 and 5, and a large-diameter portion including the open end of the mounting hole and having a large diameter than the small-diameter portion. This arrangement is identical to conventional arrangements.

The solenoid valve 10 includes a core 11 made of a magnetic material, a coil 12 for magnetizing the core 11, a valve body 13, a valve seat 14 with which the valve body 13 is moved into and out of contact, a plunger 16 integral with the valve body 13, a plunger-mounting sleeve 17, and a biasing means (coil spring) 18 biasing the plunger 16 in the direction opposite to the direction in which the plunger 16 is magnetically attracted. The solenoid valve 10 further includes a yoke 19, a bobbin 21 around which the coil 12 is wound, a case 20 covering the coil 12 and the yoke 19, a valve rod 16a integral with the plunger 16, and a moving guide 22 for guiding the movement of the valve rod 16a.

The plunger-mounting sleeve 17 comprises a cylindrical sleeve member 23 having a closed top, and a sleeve flange 24 joined to the outer periphery of the sleeve member 23. The sleeve member 23 and the sleeve flange 24 are both formed by pressing a metal sheet. But instead, they may be formed by other plastic working of a metal such as forging. The sleeve member 23 and the sleeve flange 24 are joined together by e.g. beam welding so that a liquid-tight seal is provided between their interfaces.

The sleeve flange 24 is a cap-shaped member inserted in the mounting hole 2 and including at its open end a flange portion 24a liquid-tightly joined to the outer periphery of the sleeve member 23. A cylindrical portion 24b is integrally formed at the outer periphery of the flange portion 24a which is bent toward the open end of the mounting hole 2.

The valve seat 14 is mounted in the sleeve flange 24 while being supported by a bottom wall 24c of the sleeve flange 24 which has a central hole. The valve seat 14 and the valve body 13 form a valve portion 15 for selectively opening and closing communication between the oil passages 4 and 5 and the oil passages 4 and 5 and for adjusting the flow sectional area of the passages when they communicate with each other.

The sleeve flange 24 has a tubular trunk portion formed with a hole 26 through which a valve chamber 25 defined inside the sleeve flange 24 communicates with the outside. An annular groove 7 is formed in the inner periphery of the small-diameter portion of the mounting hole 2 through which the hole 26 communicates with the oil passage 5.

The mounting ring 6 has a tapered surface 6a which is inclined such that its diameter increases toward the open end of the mounting hole 2. At its end nearer to the open end of the mounting hole 2, the tapered surface 6a has a diameter larger than the difference between the inner diameter of the large-diameter portion of the mounting hole, i.e. its portion including its open end, and twice the thickness t of the cylindrical portion 24b. Thus, simply by pressing the mounting ring 6 into the mounting hole 2, the cylindrical portion 24b is radially expanded and wedged into the inner periphery of the mounting hole. This eliminates the need to deform the cylindrical portion 24b in a separate step in order to wedge it into the inner periphery of the mounting hole.

The mounting ring 6 has an inner diameter larger than the outer diameter of the sleeve member 23. Thus, when the mounting ring is pressed into the mounting hole, no force is applied to the sleeve member 23 that tends to deform the sleeve member 23.

The plunger-mounting sleeve 17 has its flange portion 24a seated on the shoulder 3 of the mounting hole 2, and its mounting ring 6 loosely fitted around the sleeve member 23 while being press-fitted in the cylindrical portion 24b. Since the mounting ring is press-fitted in the cylindrical portion 24b, the flange portion 24a is pressed against the seating face of the shoulder 3, and the cylindrical portion 24b is at least partially wedged into the inner periphery of the mounting hole 2. As a result, the plunger-mounting sleeve 17 is fixed in position to the housing 1.

Figure 2:
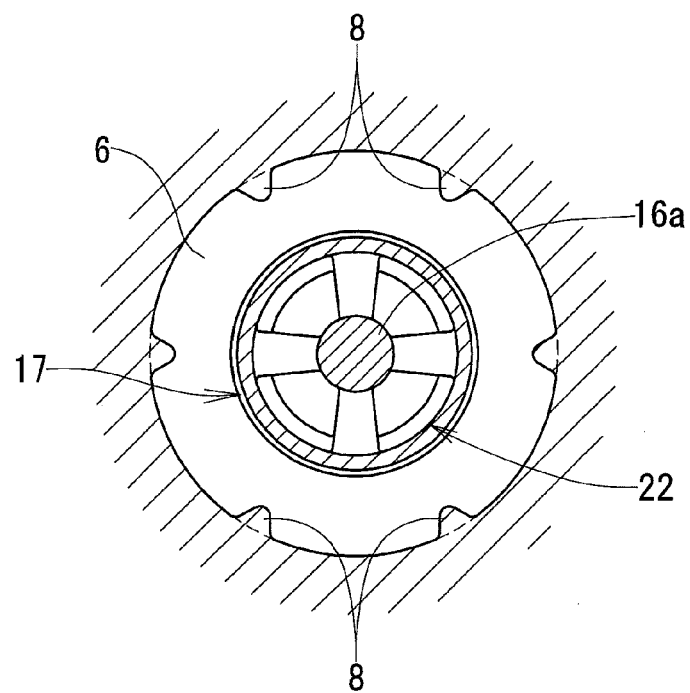
FIG. 2 shows a plurality of circumferentially spaced apart caulked portions formed on the housing.

A caulked portion 8 is provided on the inner surface of the mounting hole near its open end which is formed by plastically deforming the housing 1. The caulked portion 8 engages the mounting ring 6, thereby keeping the mounting ring 6 in position. Preferably, a plurality of such caulked portions 8 are provided circumferentially spaced from each other to reduce the pressing force. FIG. 2 shows such a plurality of (six in the figure) circumferentially spaced apart caulked portions 8.

A seal member 27 is disposed between the bottom wall 24c of the sleeve flange of the plunger-mounting sleeve 17 and the inner end of the mounting hole 2 to seal the oil passages 4 and 5.

The sleeve flange 24 and mounting ring 6 used in the device shown are made of a material having higher hardness than the material forming the housing 1. Thus, when the mounting ring is pressed in, the cylindrical portion 24b is stably radially expanded and wedged into the inner periphery of the mounting hole.

The valve body 15 is fixed to the plunger 16 through the valve rod 16a, and the moving guide 22, which is made of resin, for guiding the movement of the valve rod 16a is mounted in the sleeve member 23 of the plunger-mounting sleeve 17. The moving guide 22 is held by one of the valve rod 16a and the sleeve member 23 so as to be slidable relative to the other. The moving guide 22 also serves as a spacer that fills the gap between the valve rod 16a and the sleeve 23, and will pose no problem even if the moving guide is kept in close contact with both the valve rod 16a and the sleeve 23 without any gap left therebetween. This makes it possible to improve its guiding function by reducing the sliding gaps.

Figure 3A:
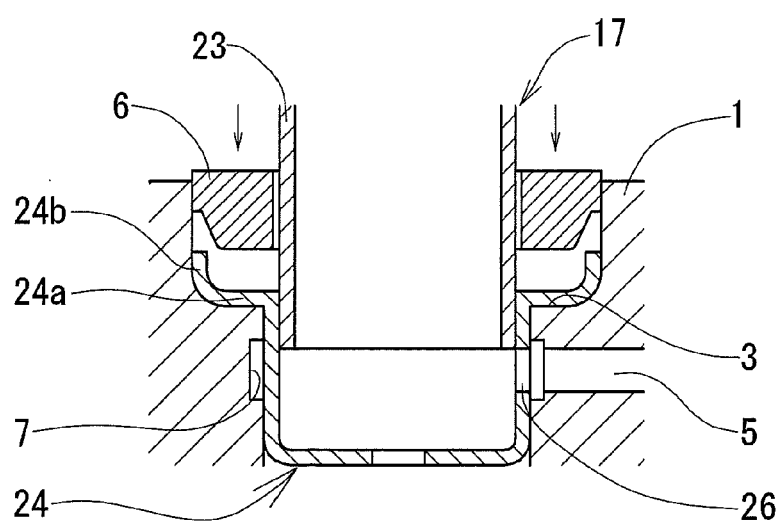
FIGS. 3A to 3C schematically show step-by-step how the plunger-mounting sleeve of the solenoid valve of FIG. 1 is fixed to the housing.
Figure 3B:
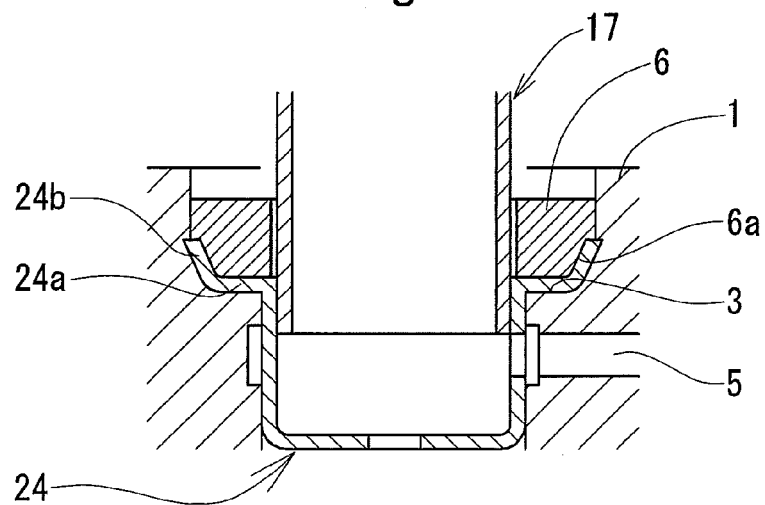
Figure 3C:
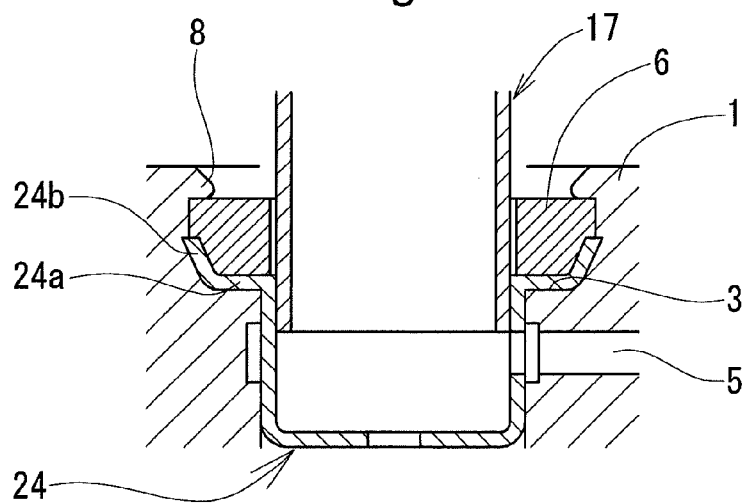
Figure 4:
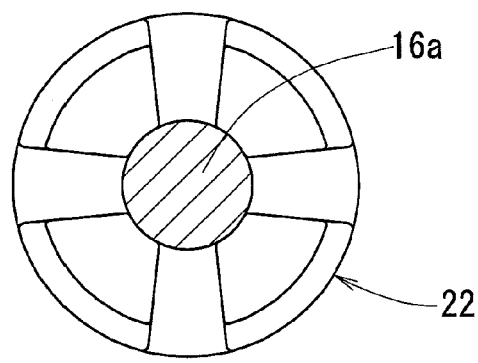
FIG. 4 is a plan view of a moving guide for the plunger.

Now referring to FIGS. 3A, 3B and 3C, description is made of how the plunger-mounting sleeve 17 is mounted to the housing 1. In FIGS. 3A to 3C, component parts in the sleeve-mounting sleeve 17 are omitted for better understanding.

As shown in FIG. 3A, the sleeve flange 24, which is provide at the leading end of the plunger-mounting sleeve 17, is inserted into the mounting hole 2 until the flange portion 24a is seated on the shoulder 3 of the mounting hole. Then, the mounting ring 6 is loosely fitted around the sleeve member 23 while being press-fitted into the cylindrical portion 24b. The press-fitting causes the cylindrical portion 24b to be radially expanded by the tapered surface 6a of the mounting ring 6 as shown in FIG. 3B, and also causes the flange portion 24a to be pressed against the seating surface of the shoulder 3 by the tapered surface 6a.

The mounting ring 6 is press-fitted such that the cylindrical portion 24b is at least partially deformed and wedged into the inner surface of the mounting hole 2.

Once the cylindrical portion 24b is wedged into the inner periphery of the mounting hole, as shown in FIG. 3C, the caulked portion or portions 8 are formed on the inner periphery of the mounting hole 2 near its open end by partially plastically deforming the housing 1 such that the caulked portion or portions 8 engage the mounting ring 6, thereby holding the mounting ring 6 in position. This completes the mounting of the plunger-mounting sleeve 17. Then, the coil and other parts are mounted to the outer periphery of the thus mounted sleeve member 23 to complete the solenoid valve.

Figure 5:
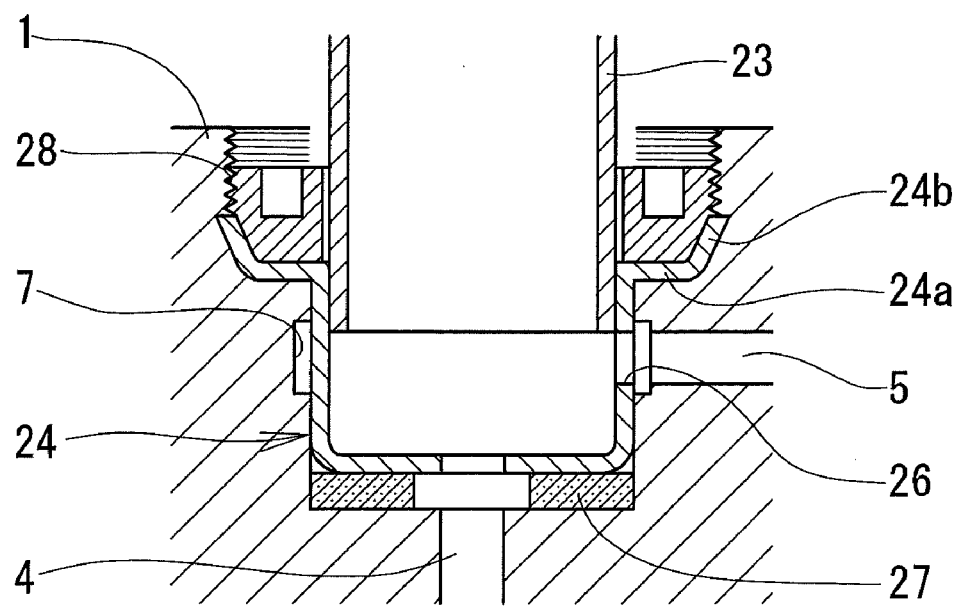
FIG. 5 schematically shows an example in which the mounting ring is threaded into and mounted in position in the mounting hole.

As shown in FIG. 5, the mounting ring 6 may have an external thread 28 on its outer periphery which are configured to be brought into threaded engagement with the inner periphery of the mounting hole 2 near its open end. With this arrangement, no caulked portion or portions are necessary.

Also, the mounting ring 6 can be pressed into the mounting hole using thrust force produced when the mounting ring is threaded into the mounting hole, and thus without the need for a pressing machine.

The core 11, valve body 13 and valve seat 14 of the solenoid valve are mounted in the plunger-mounting sleeve 17 together with the plunger 16 to form a module. By mounting this module in the housing, the device of FIG. 1 can be easily assembled.

Figure 6:
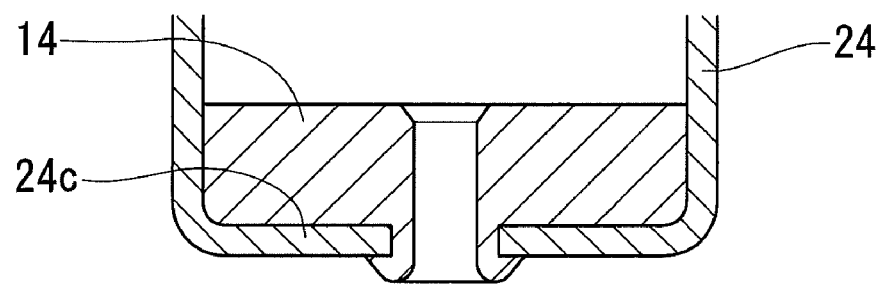
FIG. 6 is a sectional view of an example in which a valve seat is fixed to the plunger-mounting sleeve by caulking the valve seat.

FIG. 6 shows a modification in which the valve seat 14 is fixed to the bottom wall 24c of the sleeve flange 24 of the plunger-mounting sleeve 17 by caulking. By fixing the valve seat 14 to the plunger-mounting sleeve 17 by caulking, even if the sleeve flange 24 is formed of a thin metal sheet (in which case it is difficult to strongly tighten the valve seat in position by press-fitting), the valve seat can be stably fixed in position.

The hydraulic device according to the present invention can be advantageously used in e.g. a hydraulic control device in a vehicle brake assembly having electronic control functions such as an anti-lock brake system (ABS) or an electronic stability control (ESC).

What is claimed is:

1. A hydraulic device comprising:
a housing formed with oil passages therein;
said housing being further formed with a mounting hole having a first end communicating with said oil passages and a second open end open to a surface of the housing;
a solenoid valve mounted in the mounting hole, and having a valve portion comprising a valve body and a valve seat, and provided between the oil passages for selectively opening and closing the oil passages and adjusting the degree of opening of the oil passages; and
a mounting ring having a tapered surface on an outer periphery thereof, said tapered surface being inclined such that its diameter increases toward the second open end of the mounting hole, for fixing the solenoid valve to the housing;
said mounting hole having a shoulder which divides the mounting hole into a small-diameter portion including the first end of the mounting hole, and a large-diameter portion including the second open end of the mounting hole and having a larger diameter than the small-diameter portion;
said solenoid valve further comprising a plunger-mounting sleeve having a first end inserted in the mounting hole and a second end protruding from the housing, an energizing coil fitted around the second end of the plunger-mounting sleeve, and a plunger slidably mounted in the plunger-mounting sleeve and configured to be driven under a magnetic attraction force produced when said coil is energized; said valve body being integral with the sleeve;
said plunger-mounting sleeve comprising a cylindrical sleeve member, and a sleeve flange comprising a flange portion liquid-tightly joined to an outer periphery of the sleeve member, and a cylindrical portion integrally formed at an outer periphery of the flange portion and bent toward the second open end of the mounting hole;
wherein said flange portion of said sleeve flange being seated on the shoulder of the mounting hole;
wherein said mounting ring has an inner diameter larger than an outer diameter of said sleeve member and is loosely fitted around the sleeve member while being press-fitted in said cylindrical portion, and wherein said mounting ring presses said flange portion against a seating surface on the shoulder and at least partially wedges said cylindrical portion into an inner peripheral surface of the mounting hole, thereby fixing the plunger-mounting sleeve to the housing.

2. The hydraulic device of claim 1 wherein the tapered surface of the mounting ring has a diameter at its end near the second open end of the mounting hole that is larger than the difference between an inner diameter of the large-diameter portion of the mounting hole and twice a thickness of the cylindrical portion of the sleeve flange.

3. The hydraulic device of claim 1 wherein the sleeve member and the sleeve flange of the plunger-mounting sleeve are formed by plastic working of a metal.

4. The hydraulic device of claim 1 wherein the sleeve flange and the mounting ring are made of a material having higher hardness than the housing.

5. The hydraulic device of claim 1 wherein the valve body is fixed to the plunger through a valve rod, and wherein the solenoid valve further comprises a moving guide for guiding the movement of the valve rod, said moving guide being mounted in the sleeve member of the plunger-mounting sleeve so as to be slidable relative to one of the valve rod and the sleeve member.

6. The hydraulic device of claim 5 wherein said moving guide is held by the other of the valve rod and the sleeve member.

7. The hydraulic device of claim 1 wherein a caulked portion is formed on the inner periphery of the mounting hole near its second open end for engaging the mounting ring and keeping the mounting ring in position.

8. The hydraulic device of claim 7 wherein there are a plurality of the caulked portions that are circumferentially spaced from each other.

9. The hydraulic device of claim 1 wherein said mounting ring is threaded into the mounting hole from the second open end thereof and fixed in position.

10. The hydraulic device of claim 1 wherein said valve seat is mounted in the sleeve flange and fixed to the sleeve flange by caulking.

* * * * *